United States Patent
Reddy et al.

(10) Patent No.: US 10,295,992 B2
(45) Date of Patent: May 21, 2019

(54) PRODUCTION SYSTEM HAVING CONSTRAINT EVALUATOR GENERATING CONSTRAINED SEQUENCES

(71) Applicant: International Business Machines Corporation

(72) Inventors: Chandrasekhara K. Reddy, Kinnelon, NJ (US); Ashish Sabharwal, White Plains, NY (US); Horst C. Samulowitz, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 279 days.

(21) Appl. No.: 14/962,700

(22) Filed: Dec. 8, 2015

(65) Prior Publication Data

US 2017/0160730 A1    Jun. 8, 2017

(51) Int. Cl.
*G05B 19/418*     (2006.01)
(52) U.S. Cl.
CPC ........ G05B 19/41865 (2013.01); *Y02P 90/02* (2015.11)
(58) Field of Classification Search
CPC .......................................... G05B 2219/31023
USPC ....................................................... 700/100
See application file for complete search history.

(56) References Cited

U.S. PATENT DOCUMENTS

| | | | |
|---|---|---|---|
| 6,070,144 A * | 5/2000 | Ginsberg | G06Q 10/06 705/7.17 |
| 7,139,986 B2 | 11/2006 | McGuffin | |
| 7,277,768 B2 | 10/2007 | Dash et al. | |
| 7,774,827 B2 | 8/2010 | Kinser et al. | |
| 2008/0071825 A1 | 3/2008 | Dongbai | |
| 2009/0265296 A1 | 10/2009 | Narain et al. | |

OTHER PUBLICATIONS

Furhwirth et al., "Constraint Logic Programming: An Informal Introduction" Logic programming in action : proceedings LPSS'92, Second international logic programming Summer school, Zurich, Switzerland, vol. 636 of LNAI., Springer Verlag (1993), 33 Pgs.*
Paralic et al., "Scheduling of Slabs IntoPush Furnaces—Two Different Approaches" ASRTP '96, Proceedings of the 12th International Conference on Process Control and Simulation, Košice, p. 355-360, FBERG TU, 1996.*
Csonto et al., "A look at CLP—Theory and Application" Proceedings of the 13th European Meeting on Cybernetics and Systems Research, vol. 2 pp. 1125-1129, Apr. 1996.*
Li et al., "Constraint Programming Approach to Steelmaking-making Process Scheduling" Communications of the IIMA, vol. 5, Iss 3 Article 2, 2005, pp. 17-24.*
S. Dash et al., Production Design for Plate Products in the Steel Industry, IBM Journal of Research and Development, vol. 51, No. 3/4, May 2007, pp. 1-32 (pp. 345-362 as published).

* cited by examiner

*Primary Examiner* — Emilio J Saavedra
(74) *Attorney, Agent, or Firm* — Daniel P. Morris; Otterstedt, Ellenbogen & Kammer, LLP.

(57) ABSTRACT

A method for configuring a manufacturing plant includes generating a set of initial production schedules for manufacturing an entity, determining a set of consistent production schedules given each of the initial production schedules, selecting an instance of the consistent production schedules, generating a schedule for manufacturing instances of the entity, and operating the manufacturing plant using the schedule.

10 Claims, 4 Drawing Sheets

PRODUCTION SYSTEM HAVING CONSTRAINT EVALUATOR GENERATING CONSTRAINED SEQUENCES

BACKGROUND

The present disclosure relates to evaluating constraints on sequential production system.

Sequencing units of production into larger units of production is a common problem in manufacturing. Steel manufacturing is an exemplary industry in which units of production are sequenced. For example, steel slabs are cast in a casting process in sequences, cold rolled steel rounds are formed from sequences of coil steel, and campaigns are sequences of hot-rolled coils. In the chemical industry, production lines follow a continuous process with sequenced units of production to produce lots or batches.

In these fields, and others, constraints on production function can be black-boxes and are expensive, in both cost and time, to evaluate.

BRIEF SUMMARY

According to an exemplary embodiment of the present invention, a method for configuring a manufacturing plant includes generating a set of initial production schedules for manufacturing an entity, determining a set of consistent production schedules given each of the initial production schedules, selecting an instance of the consistent production schedules, generating a schedule for manufacturing instances of the entity, and operating the manufacturing plant using the schedule According to an exemplary embodiment of the present invention, a computer program product for manufacturing instances of an entity according to a production schedule comprises a computer readable storage medium having program instructions embodied therewith, the program instructions executable by a processor to cause the processor to perform a method comprising generating a set of initial production schedules for manufacturing the entity, evaluating each of the initial production schedules for inconsistencies and determining a set of consistent production schedules, selecting an instance of the consistent production schedules, and generating a schedule for manufacturing instances of the entity.

According to an embodiment of the present invention, a manufacturing plant system for processing steel casts comprises means for determining a set of consistent production schedules given each of a plurality of initial production schedules for processing a plurality of steel casts, means for selecting an instance of the consistent production schedules, means for generating a schedule for manufacturing instances of steel slab, and operating the manufacturing plant system using the schedule to process the plurality of steel casts to output a sequence of steel slabs.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

BRIEF DESCRIPTION OF THE SEVERAL VIEWS OF THE DRAWINGS

Preferred embodiments of the present invention will be described below in more detail, with reference to the accompanying drawings.

DETAILED DESCRIPTION

According to an exemplary embodiment of the present invention, long-term schedules in constrained production systems are periodically evaluated using answers to previous evaluations, generalized answers and inferences to previously unseen evaluation queries. According to an exemplary embodiment of the present invention, through the application of encoded prior knowledge, a number of calls to an evaluator can be reduced, reducing an overall cost of evaluating constraints on the system.

In this document, monotonicity of the applied constraints is assumed in the following sense: if a set of entities S is inconsistent according to a constraint evaluator then any set S', where S a subset of S', is inconsistent. Similarly, if a set of entities S is consistent then any subset S' of S is consistent. This relationship and additional knowledge (e.g., subsumption of entities) is encoded as propositional satisfiability (SAT) theory. This knowledge is exploited each time a search algorithm selects an entity to be added to an existing subset by informing an SAT solver of its choice.

Each time the search algorithm selects an entity to be added to an existing subset, the SAT solver is triggered and an inference is made based on the propositional theory that concludes whether the new entity is consistent or inconsistent with the theory (e.g., a proposed production schedule). In at least one application, the SAT solver determines whether a newly proposed addition (e.g., input of a steel slab) to a steel manufacturing process is consistent with the existing production constraints (e.g., can an assignment be found to the propositions that satisfies each production constraint?). If the theory is inconsistent, then the new entity is not feasible according to the constraint evaluator and it is ignored. If it is consistent, then a further evaluation is done utilizing the constraint evaluator and the evaluation is encoded as a clause and added to the SAT theory—thus enhancing the theory. As a consequence, the number of calls to the expensive constraint evaluator is reduced.

Exemplary embodiments of the present invention will now be described in connection with FIG. 1 and the algorithm 100 depicted therein.

Figure 1:
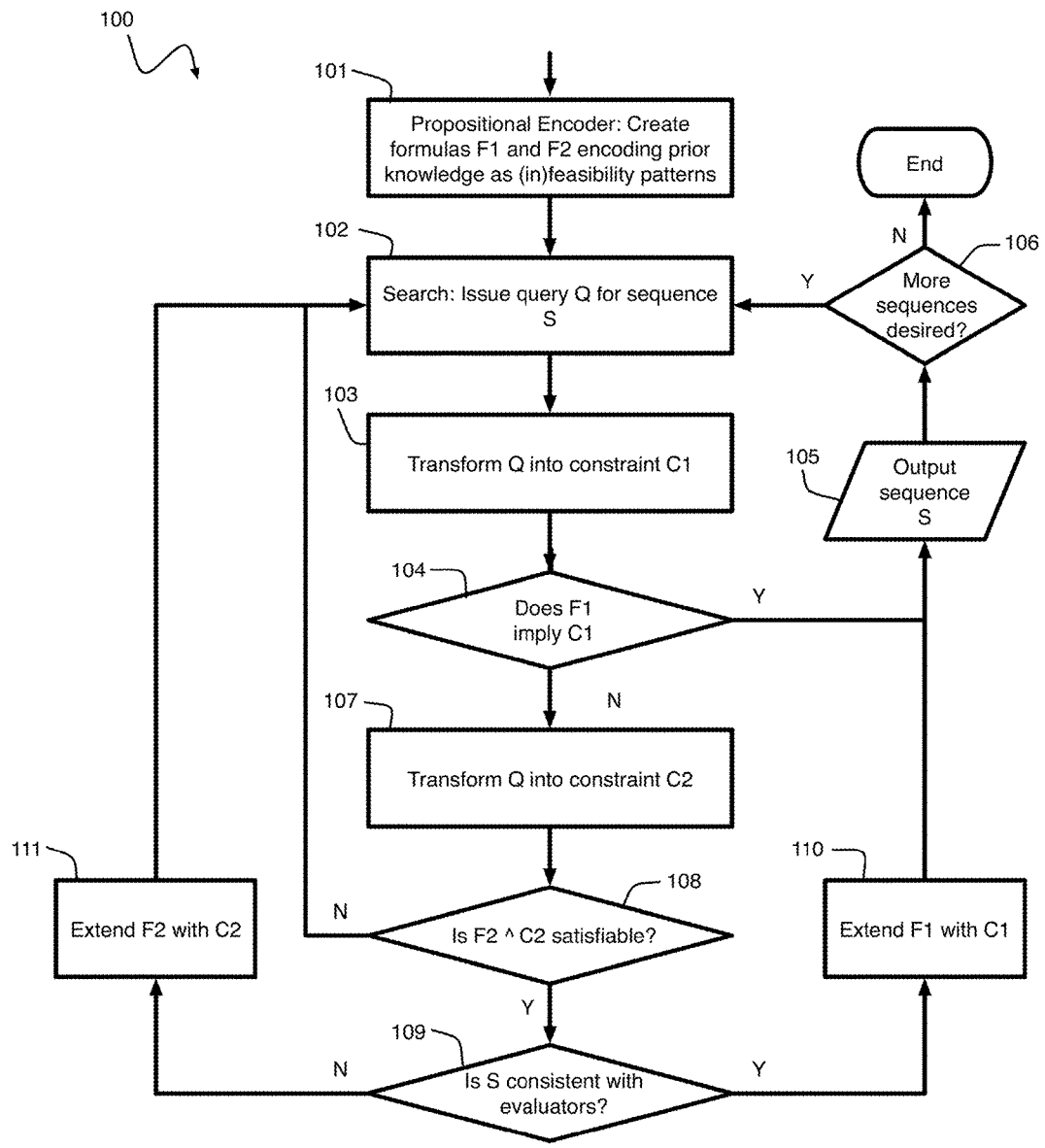
FIG. 1 is a flow diagram of a method for generating a constrained sequence according to an exemplary embodiment of the present invention.

In FIG. 1, block 101, F1 is a propositional formula for detecting sequence feasibility using the SAT solver and F2 is a propositional formula for detecting sequence infeasibility using the SAT solver. F1 and F2 can use the same or different SAT solvers. Blocks 104 and 108 are queries posed to a propositional SAT solver or an efficient inference engine for propositional logic. These blocks facilitate bypassing calls to evaluators.

Block 109 is a query posed to domain-specific evaluators. More particularly, the sequence of entities S is checked for consistency with the evaluators.

At block 110, the sequence S that has been found to be feasible is incorporated into F1. At block 111, the sequence S that has been found to be infeasible is incorporated into F2. At block 105, the feasible constrained sequence is found and output.

According to an embodiment of the present invention and an SAT encoding for Feasibility (F1) (see for example, block 101), a sequence formed by n items, A1 to An, is mapped to a constraint C1 over propositional variables, and tested against the propositional formula F1 to determine whether the sequence of n items can be inferred to be consistent from previous evaluations.

For example, consider the exemplary case of position and length based encoding. Formula F1 defines propositional variables $Z_{i,p}$ having semantics "item Ai is at position p in the sequence" and propositional variables $L_p$ having semantics "a sequence of length p is constructed," with no initial constraints.

Query Q (example) asks whether the sequence S of items A3, A6, A7 is feasible, starting at position 1? (See for example, block 102.)

In this case, Query Q is converted into constraint C1: $(\neg Z_{3,1}\ \neg Z_{6,2}\ \neg Z_{7,3}\ L_3)$ (see block 103). Constraint C1 is tested for entailment from F1 (see block 104): does F1 imply C1? This query is encoded equivalently as: is $(F1 \neg C1)$ unsatisfiable? If the answer is yes, the SAT solver has inferred that S is feasible based on previous calls to the (black-box) evaluators (see also FIG. 4, block 402). Only if the answer is no, the evaluators are invoked on S. If the evaluators find S to be feasible, F1 is extended by conjoining it with C1, thus recording that S has been found to be feasible and ensuring that future entailment tests for C1 will succeed. If evaluators are known to respect monotonicity of subsequences, F1 is also extended with constraints for subsequences of S. In this case, any such subsequence can be determined to be feasible without having to check with the evaluators.

There exist various ways to encode semantics in propositional logic. According to an embodiment of the present invention, a trade-off exists between the number of introduced variables and constraints, and the kinds of inference they efficiently support (e.g., absolute positions vs. relative positions). Multiple encodings can be used simultaneously by channeling between different encodings According to an embodiment of the present invention and an SAT encoding for infeasibility (F2), a sequence formed by n items, A1 to An, is mapped to a constraint C2 over propositional variables and are tested against a propositional formula F2 to check whether the sequence of n items violates known feasibility patterns or can be inferred to be inconsistent from previous evaluations.

In another example, consider the exemplary case of position based encoding: Formula F2 defines propositional variables $X_{i,p}$ having semantics "item Ai is at position p in the sequence" and constraints encoding disallowed patterns, e.g., "A4 cannot follow A3" is encoded as the set of constraints $(\neg X_{3,1} \lor \neg X_{4,2}) \land (\neg X_{3,2} \lor \neg X_{4,3}) \land (\neg X_{3,3} \lor \neg X_{4,4}) \land \ldots$.

Query Q (example) asks whether the sequence S of items A3, A6, A7 feasible, starting at position 1?

Query Q is converted into constraint C2: $X_{3,1} \land X_{6,2} \land X_{7,3}$ (see block 107). Constraint C2 is tested for consistency with F2 (see block 108): can $(F2 \land C2)$ be satisfied? If the answer is no, the SAT solver has inferred that sequence S is infeasible based on known patterns or previous (black-box) evaluations (see also FIG. 4, block 402). Only if the answer is yes, the evaluators are invoked on S. If the evaluators find S to be infeasible, F2 is extended by conjoining it with the negation of C2, namely $(\neg X_{3,1} \lor \neg X_{6,2} \lor \neg X_{7,3})$, thus recording that S has been found to be infeasible by the evaluators and that future consistency tests with C2 will fail.

In yet another example, consider a position-invariant relative encoding. An alternative formulation for F2 (can be used in conjunction with the above) defines propositional variables $Y_{i,j}$ having semantics "item Ai is immediately followed by Aj in the sequence" and constraints encoding disallowed patterns, e.g., "A4 cannot follow A3" is encoded simply as $\neg Y_{3,4}$.

According to an exemplary embodiment of the present invention, a system for evaluating constraints on sequential production simultaneously uses a principled method of encoding knowledge, use of prior knowledge in making new decisions, dynamic learning of knowledge for both feasible and infeasible settings, and a generalization of feasible and infeasible settings (e.g., re-use of knowledge in different contexts), to develop a capability for efficiently utilizing black-box evaluators.

It should be understood that the methodologies of embodiments of the invention may be particularly well-suited for steel manufacturing in which constraints can include, for example, steel grade constraints, dimension constraints, grouping or grading constraints (e.g., charge-grade constraints, weight constraints, etc.), etc. Cast design is an important and complex process in the production design of steel manufacturing. Current systems for determining Availability-To-Promise (ATP) do not consider sequencing constraints. The ATP process requires a quick determination of whether and when an order can be fulfilled, and answering that question requires satisfaction of several complex sequencing constraints whose evaluation includes a prohibitively long computational time. Hence, any assigned ATP dates ignore such constraints. This results in poor on-time delivery performance, and forces scheduling of late orders, which, in turn, leads to other inefficiencies. Exemplary embodiments of the present invention improve the ATP system in steel and other manufacturing areas. Speeding up constraint evaluations leads to speed-ups in the important process of cast generation, e.g., 100× speed-ups in cast generation. This speed-up enables accurate ATP determination for orders, and generation of efficient schedules.

Figure 2:
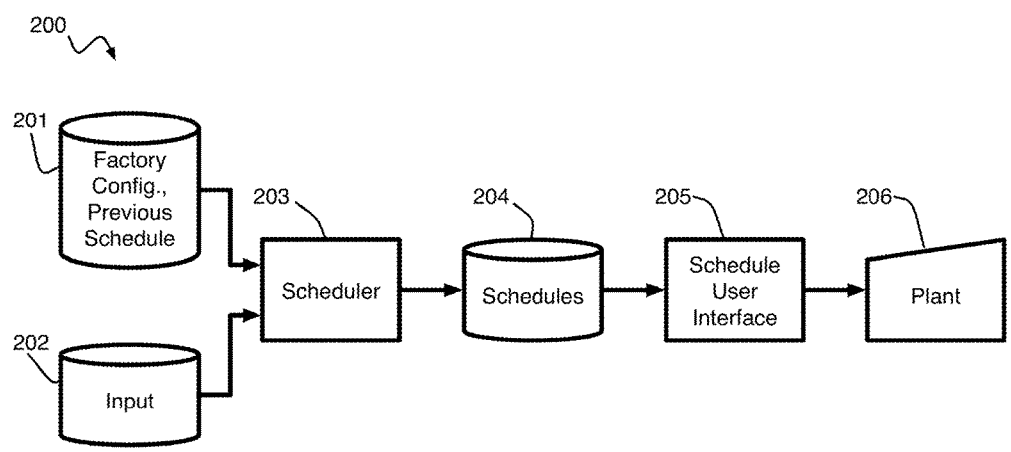
FIG. 2 is a flow diagram of a method for generating cast schedules according to an exemplary embodiment of the present invention.

Referring now to FIG. 2, in a system for processing steel casts 200, according to an exemplary embodiment of the present invention, a steel cast scheduler 203 accesses one or more databases to obtain input including a factory configuration and a previous schedule 201 and an accounting of raw materials 202. The account of the raw materials can include data about input material, such as steel slabs, which are semi-finished casting products. The cast scheduler 203 determines one or more cast schedules 204 (see also 106, FIG. 1). Each cast schedule includes one or more sequences of casts. A sequence of casts is a production schedule to be followed by a casting machine (including for example, cutters, furnace, rolling mills, etc.). Each steel cast is typically made up of one strand, or a pair of coordinated strands. Each strand is a sequence of slabs that typically vary in their widths and grades. The cast scheduler 203 outputs the cast schedule 204, which can be accessed by a human operator via a user interface 205, and is used as input to configure a manufacturing plant 206 to process the steel casts. In one or more embodiments of the present invention, the manufacturing plant 206 is operated according to the cast schedule, wherein a continuous casting machine outputs slabs having dimensions specified by the cast schedule. The slabs are then routed, at times specified by the cast schedule, through a furnace, slabbing mill, a roughing mill preparatory, a rolling machine, etc. The manufacturing plant 206 processes slabs into plate products, cold coil products, and the like.

Figure 3:
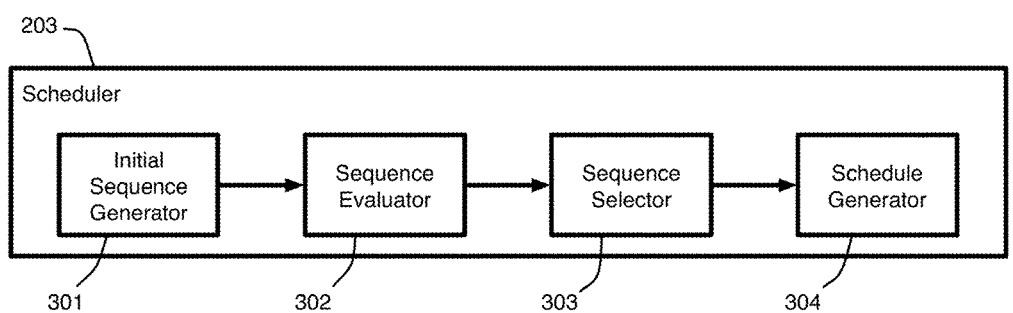
FIG. 3 is a block diagram of a cast scheduler according to an exemplary embodiment of the present invention.

The steel cast scheduler 203 is further depicted in FIG. 3 and includes a cast sequence generator 301, sequence evaluator 302, a sequence selector 303 and a schedule generator 304. Each sequence corresponds to a strand or a pair of strands. The cast sequence generator 301 outputs sequences of slabs, taking into consideration high-level objectives (e.g., productivity and efficiency objections of the schedule). The sequence evaluator 302 determines which of the generated sequences are valid according to the manufacturing constraints.

Figure 4:
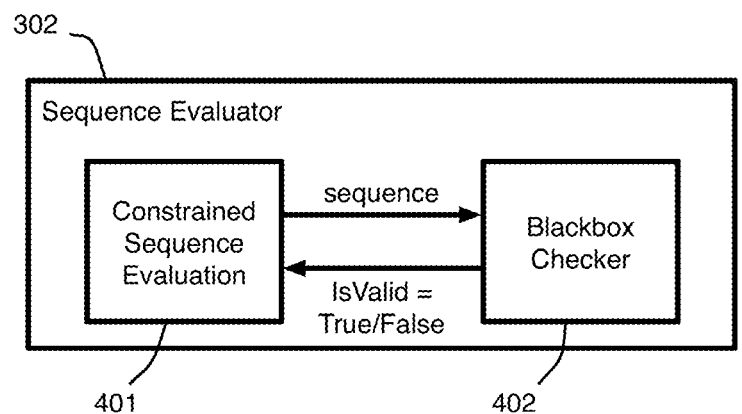
FIG. 4 is a block diagram of a sequence evaluator according to an exemplary embodiment of the present invention.

The sequence evaluator 302 is further depicted in FIG. 4 and includes a constrained sequence evaluator 401 and a checker 402. The checker 402 determines whether a sequence or a subsequence is valid under the constraints. The constrained sequence evaluator 401 uses the evaluation information from the checker 402, and reduces the number of evaluations performed by the checker 402. That is, the evaluator 401 makes an inference within the satisfiability theory based on prior knowledge and dynamically acquired knowledge employed to prevent at least one new evaluation.

Figure 5:
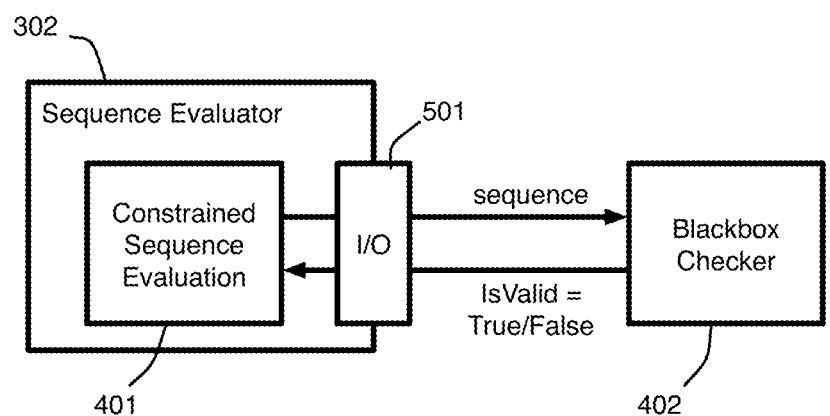
FIG. 5 is a block diagram of a sequence evaluator according to an exemplary embodiment of the present invention.

Stated another way, FIG. 4 shows a system configured to perform the algorithm depicted in FIG. 1, where checking against the black-box checker (or evaluator) is depicted by block 109. The only sequences for which neither their feasibility through F1 nor their infeasibility through F2 can be established are sent to the black-box checker 402. For the remaining sequences, the invocation of the black-box checker is not needed, and the costly evaluations are avoided. According to an embodiment of the present invention, the sequences that have been evaluated by the black-box checker, and any sequences subsumed by these sequences, will not be evaluated by the black-box checker again in future. Their feasibility or infeasibility is determined by satisfiability solvers, which are typically faster, compared to the evaluation by the black-box checker. As shown in FIG. 5, the black-box checker can be a human expert whose time is costly, and repeated, unnecessary involvement of a human is prohibitive. In this embodiment, the sequence evaluator 302 comprises the constrained sequence evaluation block 401 and an input/output interface 501 for communicating sequences and receiving a determination of the black-box checker.

By way of recapitulation, according to an exemplary embodiment of the present invention, a method for manufacturing instances of an entity according to a production schedule includes generating a set of initial production schedules for manufacturing the entity, evaluating each of the initial production schedules for inconsistencies and determining a set of consistent, feasible production schedules, selecting an instance of the consistent production schedules, and generating a schedule for manufacturing instances of the entity.

The methodologies of embodiments of the disclosure may be particularly well-suited for use in an electronic device or alternative system. Accordingly, embodiments of the present invention may take the form of an entirely hardware embodiment or an embodiment combining software and hardware aspects that may all generally be referred to herein as a "processor," "circuit," "module" or "system."

Furthermore, it should be noted that any of the methods described herein can include an additional step of providing a system 100 configured to disambiguate alerts. Further, a computer program product can include a tangible computer-readable recordable storage medium with code adapted to be executed to carry out one or more method steps described herein, including the provision of the system with the distinct software modules.

Figure 6:
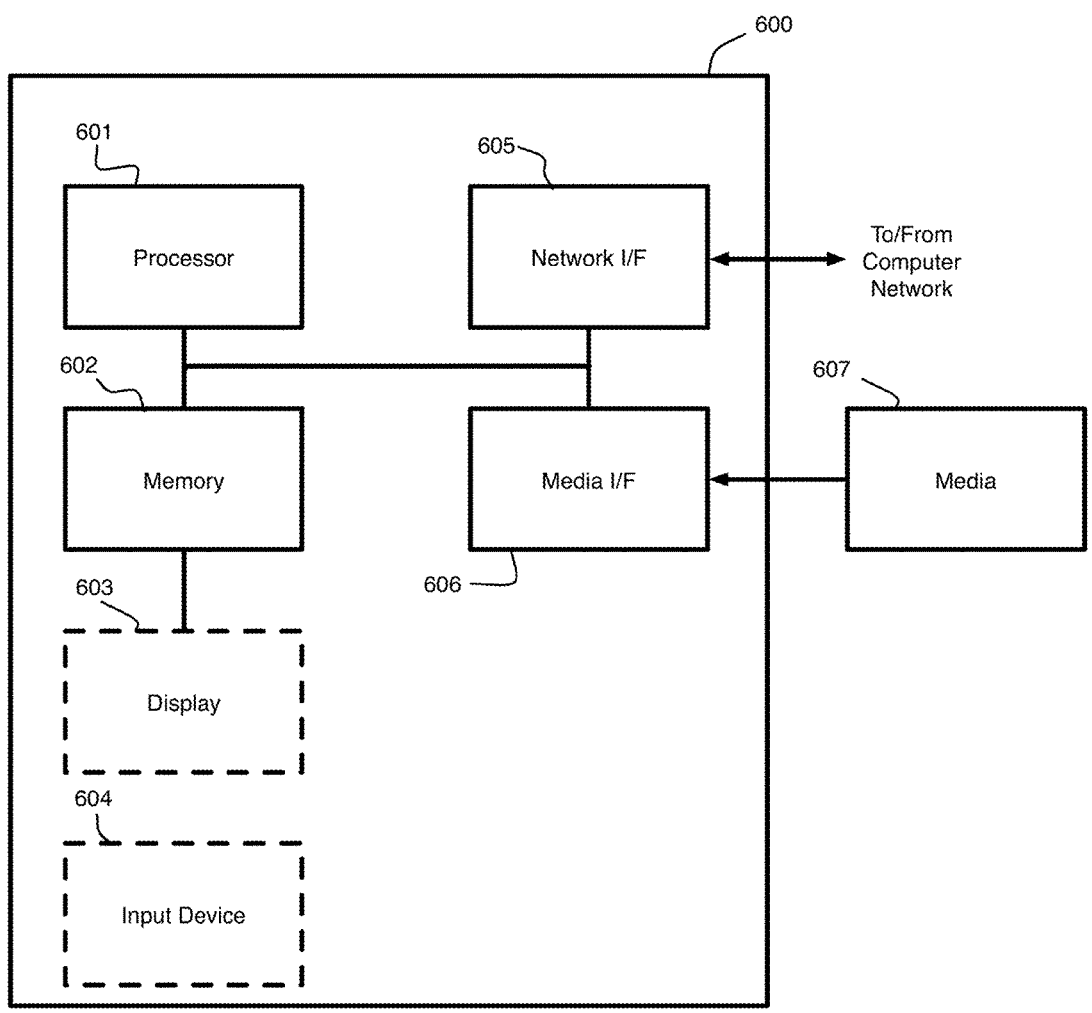
FIG. 6 is a diagram of a computer system configured for generating a constrained sequence according to an exemplary embodiment of the present invention.

Referring to FIG. 6; FIG. 6 is a block diagram depicting an exemplary computer system embodying the algorithm 100 and configured to generate constrained sequences such as a cast schedule (see FIG. 1) and operate a manufacturing plant using the cast schedule (see FIG. 2) according to an embodiment of the present invention. The computer system 600 shown in FIG. 6 includes a processor 601, memory 602, display 603, input device 604 (e.g., keyboard), a network interface (I/F) 605, a media I/F 606, and media 607, such as a signal source, e.g., camera, Hard Drive (HD), external memory device, etc.

In different applications, some of the components shown in FIG. 6 can be omitted. The whole system shown in FIG. 6 is controlled by computer readable instructions, which are generally stored in the media 607. The software can be downloaded from a network (not shown in the figures), stored in the media 607. Alternatively, software downloaded from a network can be loaded into the memory 602 and executed by the processor 601 so as to complete the function determined by the software.

The processor 601 may be configured to perform one or more methodologies described in the present disclosure, illustrative embodiments of which are shown in the above figures and described herein. Embodiments of the present invention can be implemented as a routine that is stored in memory 602 and executed by the processor 601 to process the signal from the media 607. As such, the computer system is a general-purpose computer system that becomes a specific purpose computer system when executing routines of the present disclosure.

Although the computer system described in FIG. 6 can support methods according to the present disclosure, this system is only one example of a computer system. Those skilled of the art should understand that other computer system designs can be used to implement embodiments of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of configuring a sequential production system manufacturing instances of a steel product under a plurality of production constraints, the method comprising:
    generating a set of initial production schedules for manufacturing the instances of the steel product using the sequential production system;
    determining a set of consistent production schedules from the initial production schedules, wherein the set of consistent production schedules are valid according to the plurality of constraints including a positional constraint and a time constraint;
    receiving at least a first proposed addition and a second proposed addition to the set of consistent production schedules;
    inferring, using a propositional satisfiability solver encoding a knowledgebase of prior consistent production schedules, that the first proposed addition is feasible and that the second proposed addition is infeasible;
    providing the first proposed addition to a constraint evaluator;
    receiving from the constraint evaluator an indication that the first proposed addition is consistent;
    generating a schedule for manufacturing instances of the steel product according to the subset of the consistent production schedules including the first proposed addition;
    preventing the constraint evaluator from evaluating the second proposed addition upon inferring, using the propositional satisfiability solver encoding the knowledgebase of prior consistent production schedules, that the second proposed addition is infeasible; and
    operating a continuous casting machine of the sequential production system in manufacturing the instances of the steel product from a raw material according to the schedule.

2. The method of claim 1, further comprising evaluating each of the initial production schedules by encoding a plurality of feasible evaluations and their generalizations as propositional constraints in the propositional satisfiability solver.

3. The method of claim 2, wherein evaluating each of the initial production schedules comprises:
    encoding responses from a plurality of evaluators; and
    incorporating encoded responses incrementally into the propositional satisfiability solver as new propositional constraints.

4. The method of claim 1, further comprising evaluating each of the initial production schedules by encoding a plurality of infeasible evaluations and their generalizations as propositional constraints in the propositional satisfiability solver.

5. The method of claim 4, wherein evaluating each of the initial production schedules comprises:
    encoding responses from a plurality of evaluators; and
    incorporating encoded responses incrementally into the propositional satisfiability solver as new propositional constraints.

6. A computer program product for manufacturing instances of a steel product under a plurality of production constraints, the computer program product comprising a computer readable storage medium having program instructions embodied therewith, the program instructions executable by a processor to cause the processor to perform a method comprising:
    generating a set of initial production schedules for manufacturing an entity the instances of the steel product using a sequential production system;
    evaluating each of the initial production schedules for inconsistencies and determining a set of consistent production schedules from the initial production schedules, wherein the set of consistent production schedules are valid according to the plurality of production constraints including a positional constraint and a time constraint;
    receiving at least a first proposed addition and a second proposed addition to the set of consistent production schedules;
    inferring, using a propositional satisfiability solver encoding a knowledgebase of prior consistent production schedules, that the first proposed addition is feasible and that the second proposed addition is infeasible;
    providing the first proposed addition to a constraint evaluator;
    receiving from the constraint evaluator an indication that the first proposed addition is consistent;
    generating a schedule for manufacturing instances of the steel product according to the subset of the consistent production schedules including the first proposed addition;
    preventing the constraint evaluator from evaluating the second proposed addition upon inferring, using the propositional satisfiability solver encoding the knowledgebase of prior consistent production schedules, that the second proposed addition is infeasible; and
    operating a continuous casting machine of the manufacturing plant to output the instances of the steel product from a raw material using the schedule.

7. The computer program product of claim 6, wherein evaluating each of the initial production schedules comprises encoding a plurality of feasible evaluations and their generalizations as propositional constraints in the propositional satisfiability solver.

8. The computer program product of claim 7, wherein evaluating each of the initial production schedules comprises:
    encoding responses from a plurality of evaluators; and
    incorporating encoded responses incrementally into the propositional satisfiability solver as new propositional constraints that are not entailed by a current theory.

9. The computer program product of claim 6, wherein evaluating each of the initial production schedules comprises encoding a plurality of infeasible evaluations and their generalizations as propositional constraints in the propositional satisfiability solver.

10. The computer program product of claim 9, wherein evaluating each of the initial production schedules comprises:
   encoding responses from a plurality of evaluators; and
   incorporating encoded responses incrementally into the propositional satisfiability solver as new propositional constraints that are not entailed by a current theory.

* * * * *